March 8, 1938.  J. H. ALLISON  2,110,654
SEPARATOR
Filed Aug. 15, 1936   2 Sheets—Sheet 1

Inventor
JESSE H. ALLISON.
by Charles H. Fields Attys.

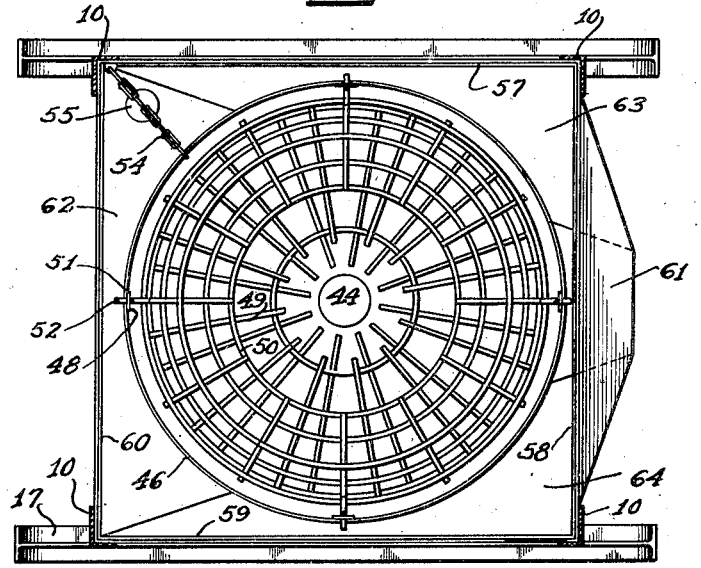
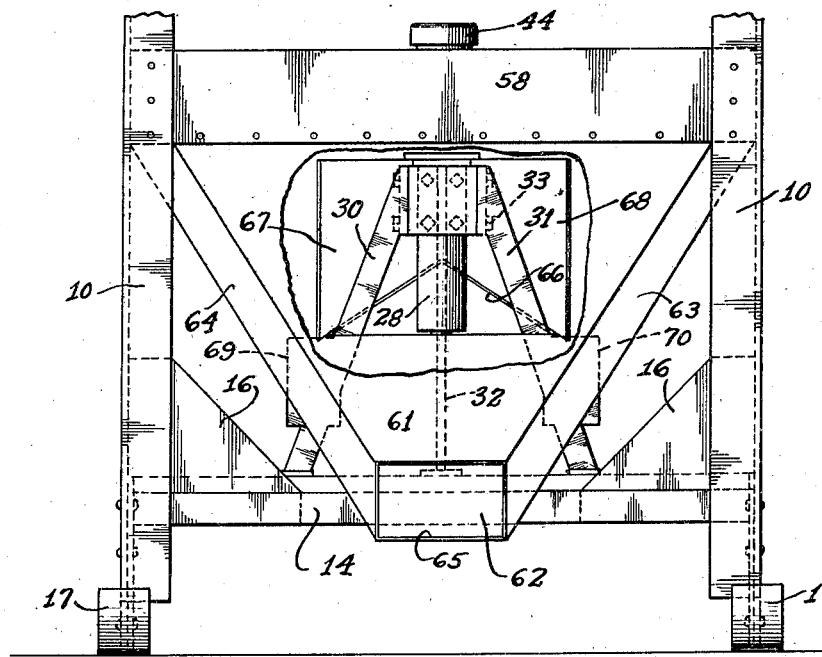

Patented Mar. 8, 1938

2,110,654

UNITED STATES PATENT OFFICE 2,110,654

SEPARATOR

Jesse H. Allison, El Paso, Tex.

Application August 15, 1936, Serial No. 96,143

2 Claims. (Cl. 209—445)

The present invention relates to an improved separator for separating the lighter and heavier particles of a comminuted material.

Although I have chosen to describe my invention in connection with a device which finds particular use in the separation of placer gold and other metals from sand and gravel by concentration, it will be apparent to one skilled in the art that the principles of the invention may be embodied in other devices for use in other fields for purposes of like nature, and is not necessarily to be limited to the particular field of use described herein.

In my Patent No. 1,986,179, which issued May 17, 1933, I have described a separator wherein the material to be separated is fed into the device by means of a hopper arrangement in which the discharge of material therefrom is facilitated by the operation of the separating instrumentalities.

More specifically, in my patented device, a pan or basin is removably carried by a crank which causes the pan to be agitated or vibrated with a gyratory motion. The crank is located at the hopper discharge opening, whereby movement of the material from the hopper is greatly facilitated and aided.

In the foregoing device, the bottom of the separator pan was flared upwardly from the center thereof to a peripheral rim so that during its operation the lighter particles would be moved outwardly and discharged over the rim, whereas the heavier particles of metalliferous material would move downwardly and travel to the bottom of the pan and accumulate at its deepest portion.

The present invention seeks to provide improvements in my previously patented arrangement, whereby the cost of construction may be decreased and at the same time improved operation may be attained.

A further feature resides in the provision of improved supporting means for the separating instrumentalities.

It is also an object to provide an improved separator pan including means associated therewith for positively keeping the material in the pan agitated and in a loosened condition so that the vibratory movement of the pan will more effectively separate the lighter and heavier particles thereof.

Other objects and features of the invention will more fully appear from the following detailed description taken in connection with the accompanying drawings, which illustrate a single embodiment thereof and in which:

Figure 2 is a transverse sectional view through the device showing means within the separator pan for augmenting the separation of the heavier and lighter particles of the comminuted material therein; and Figure 3 is a view in elevation on the discharge side of the device, portions being cut away to disclose the pedestal support for the driving shaft of the device.

As shown on the drawings:

Figure 1:
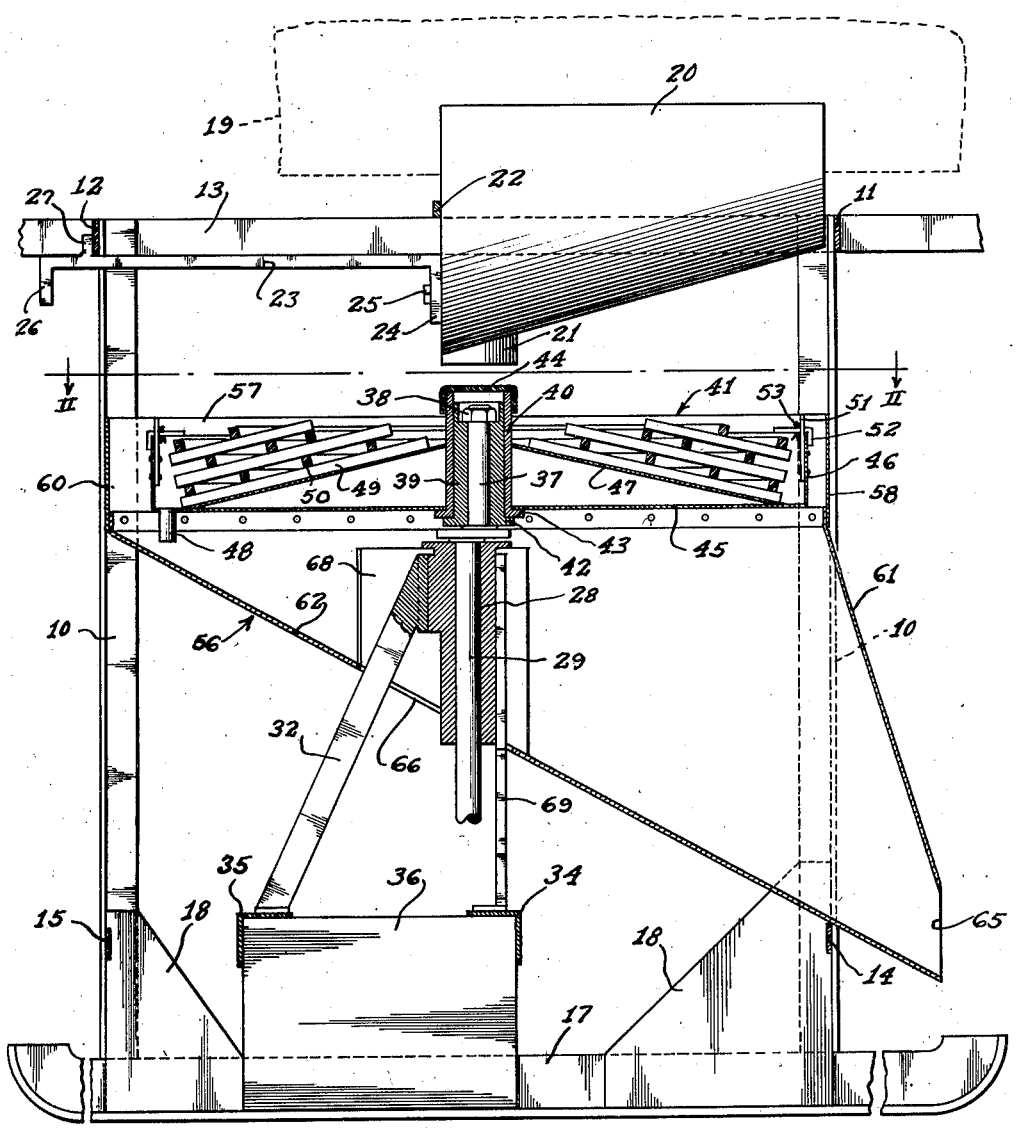
Figure 1 is an enlarged vertical sectional view showing the operative relationship of the various parts of the herein described invention.

In the illustrated embodiment of the invention, there is disclosed on the drawings, a frame structure including corner posts 10 of angle irons which are disposed at the four corners of a rectangular framework. These corner posts are interconnected at their upper ends by front and rear cross members 11 and 12 respectively, and side members 13—13 which extend forwardly and rearwardly of the members 11—12. At the bottom of the framework, the two forwardly disposed corner posts are interconnected by a forward rail or member 14, and the rearwardly disposed posts by a rear rail or member 15, these rails being upwardly positioned from the ends of the corner posts and interconnected at their ends with the associated corner posts by means of gusset plates 16. The forward and rear corner posts on each side of the framework are secured at their lowermost ends to a runner or skid 17 which is additionally strengthened by means of gusset plates 18. In practice, it has been found desirable to construct these runners of T-beams which may be secured in position with their central ribs uppermost and curved at their ends, thus providing convenient and ready means for moving the separator from one location to another.

The extended side members 13—13 may be utilized for supporting a trommel, when a trommel is to be operated with the herein described separator. The trommel is of the usual construction and contains a rotatable drum of sieve-like construction which would be disposed as generally indicated in dotted lines as shown at 19. Disposed below the rotatable drum of the trommel, and supported on the members 13—13 for sliding movement is a hopper 20 having a slanting bottom containing at one end a discharge tube 21. The sides of this hopper extend upwardly around a portion of the trommel drum and the hopper is closed at its ends except for cutout portions which enable the ends to receive in these cutout portions the drum of the trommel.

The hopper 20 is supported at one end by a transverse bar 22 which may be riveted or otherwise secured to the associated end of the hopper. This bar is supported on the upper edges of the side members 13—13.

Secured to this end of the hopper is an elongated bar 23 which is deflected at one end as shown at 24 to define a right-angular portion which is secured to the hopper as by a bolt 25. It will be noted that the bar 23 extends below the rear rails 12 and is provided with a downwardly deflected portion 26 which forms a handle. On the upper surface of the bar 23 adjacent the handle 26, there is provided an upwardly projecting lug 27 for limiting movement of the hopper to the right as shown in Figure 1. However, by pulling on the handle 26 the lug 27 will be moved away from member 12 and the member 20 may be shifted to the left to enable cleaning of the device.

Centrally disposed within the framework is a bearing 28 which is arranged to rotatably support therein in a vertical position a driving shaft 29. The bearing is supported on a tripod pedestal which is composed of a pair of downwardly diverging legs 30 and 31, these legs lying in the same plane and disposed on the forward side of the bearing. Cooperating with these legs is a rearwardly disposed leg 32. These legs at their upper ends are provided with plate portions which are secured as by bolts 33 to the bearing.

The legs 30 and 31 at their lower ends are connected to a transversely extending angle bar 34, and leg 32 is secured to a rearwardly spaced angle bar 35. The angle bars 34 and 35 are supported at their ends by plate members such as shown at 36, these plate members being disposed vertically and respectively connected at their lowermost margins to the runners 17—17.

The lowermost end of shaft 29 may be connected to any desired form of power by means of which the shaft may be rotated, and it may be found necessary in some cases to provide a gear drive as shown in my above mentioned patent structure.

The upper end of the shaft 29 is provided with an offset arm 37 defining a crank. The upper end of this arm is threaded to receive a nut 38 by means of which a bearing member 39 is retained against axial movement of the crank arm but may rotate relative thereto.

A hub 40 of a pan or basin, generally indicated at 41, is arranged to slidably fit the bearing member 39. The bearing member and hub are respectively provided with abutment flanges 42 and 43 at their bottom ends, the hub being retained against removal from the bearing member merely by virtue of the weight of the hub and pan associated therewith. The upper end of the hub is provided with a cap 44 which extends over the bearing and nut 34, thereby protecting these parts against the entrance of gravel, dirt and the like which would soon cause the parts to wear out.

The separator pan or basin 41 is in general of cylindrical shape having a bottom 45 which is apertured at its center to receive the hub therein, the pan being supported on the abutment flange 43 of the hub and secured thereto as by welding. It will be noted that this bottom extends at right-angles to the vertical axis of the hub and its periphery is deflected upwardly to define a wall portion 46.

The separator pan is also provided with a false bottom 47 of frusto-conical shape which is placed in the pan with its base portion at the periphery of the pan and its apex at the hub 40. The false bottom is secured as by welding to the hub 40 and to the bottom of the pan adjacent the wall thereof. With this arrangement it will be noted that the shallowest portion of the pan is adjacent the hub whereas the deepest portion of the pan lies adjacent the pan wall.

Adjacent the wall of the pan and just outside of the lower edge of the false bottom, there is disposed a discharge tube 48 whereby material which has accumulated at the lower edge of the false bottom of the pan may be discharged. Disposed within the pan and supported upon the false bottom 47 is a web-like structure composed of a plurality of radially extending bar or riffle members 49 and circumferentially extending bar or riffle members 50 which are built up into a skeleton-like framework. This framework, since the circumferentially extending members are spaced apart and since the radially extending members are also spaced apart to form spaces through which the material being separated may progress from the central portion of the pan to its outermost periphery, will keep the material agitated and in a loose condition so that the material may be more efficiently separated.

The web structure is retained against removal from the pan by means of retaining members which are disposed in quadrature about the pan periphery. These members each comprise a vertically disposed plate 51 which is secured in a vertical position as by rivets to the pan wall with one end projecting above the wall. The projecting end of the plate 51 is provided with an aperture for receiving therein an L-shaped member 52 in such a manner that one leg of the member will abut the outer wall of the pan and the other leg will project over the web-like structure. This latter leg is provided with an aperture for receiving a pin 53 which serves to prevent removal of the member 52 from member 51 until such time as it is desired to remove the web-like structure from the pan. When it is desired to clean the pan and remove the web-like structure, it is only necessary to remove the pin 53 whereupon member 52 may be withdrawn to permit removal of the web-like structure.

It will be noted that the cap 44 at the top of the hub 40 is disposed so as to rotate below the discharge tube 21 of the hopper. This movement of the hub will facilitate movement of the discharge material from the hopper and will tend to evenly distribute the material in the central portion of the separator pan.

The pan is held against rotational movement by means of a flexible connection such as a chain 54 which is connected at one end to the pan and anchored at its other end to some convenient portion of the housing or the framework. Secured to this chain is a weight 55. Since the pan is held against rotary motion, it will be seen that movement of the crank will impart a gyratory movement to the pan which will act to cause the lighter materials in the pan to move toward the periphery of the pan down the inclined bottom thereof, whereas the heavier particles will be retained by the web-like structure in the pan. Moreover, in the movement of particles from the central portion of the pan toward its periphery, the web-like structure will necessitate the movement of the particles in an irregular path and the particles will be maintained in a more or less loosened condition and prevented from forming a compact mass.

From the discharge spout 48, the discharged material passes into a waste hopper generally indicated at 56.

The waste hopper is open at its uppermost end and is formed with a portion defined by side walls 57, 58, 59 and 60. The lower edges of the side walls are riveted or otherwise secured to a chute having an inclined front wall 61, an inclined rear wall 62 which forms the bottom of the chute, and side walls 63 and 64, these walls tapering from the vertically disposed tubular portion surrounding the pan to a discharge opening 65 at the forward side of the apparatus.

Referring to Figure 3, the bottom wall of the chute is provided with a triangular shaped opening 66 through which the legs 30, 31 and 32 of the pedestal extend. In order to prevent the waste material from passing through this opening, there is provided a pair of divergent plates 67 and 68 which are secured together as by welding at their contiguous edges on the side of the triangular opening adjacent the leg 32. These plates form a separator which guides the waste material away from the triangular opening 66.

The legs 30 and 31 are respectively provided with laterally projecting portions 69 and 70 which are integrally formed therewith and have their uppermost edges abutting the bottom 62 of the chute, thereby forming a rigid support for this portion of the chute. The lowermost end of the chute adjacent the discharge opening 65 rests upon the frame member 14, whereby this end of the chute is supported.

From the foregoing description, it will be apparent that this invention provides an improved separator which may be easily transported from one location to another; a separator which is so constructed that the action of the separator instrumentalities facilitates a discharge of the material from the hopper; in which the separation of the comminuted material is augmented by means of a web-like structure disposed in the separator pan; and in which an improved support for the driving mechanism is provided.

Now, it is of course, to be understood that although I have described in detail the preferred embodiment of my invention, the invention is not to be thus limited but only insofar as defined by the scope and spirit of the appended claims.

I claim as my invention:

1. In a separator, a separator pan supported for vibratory movement, a removable framework supported in the pan for keeping a material placed therein for separation in a loosened condition, and a hopper disposed above said pan for delivery of said material to the pan, said hopper having a discharge opening normally positioned to discharge material at the center of said pan, and a slide mounting for the hopper, whereby it may be moved to one side to enable removal of the framework from the pan and cleaning of the pan.

2. In a separator, a separator pan supported for vibratory movement, said pan having a bottom slanting downwardly from its central portion to its periphery, whereby the deepest portion of the pan is adjacent the periphery, and a frame structure disposed in the pan for causing a comminuted material therein to be moved in an irregular path and maintained in a loosened condition during the separating operation, said structure comprising alternate levels of circumferentially spaced radial bars and radially spaced circumferentially extending bars, the innermost ends of the radial bars at the respective levels being increasingly spaced from the central axis of the pan in going from the bottom to the top of the structure.

JESSE H. ALLISON.